United States Patent [19]

Dillard

[11] 4,177,028
[45] Dec. 4, 1979

[54] ADJUSTABLE APPARATUS FOR PRODUCING A FOAM MATERIAL

[75] Inventor: James G. Dillard, Grand Rapids, Mich.

[73] Assignee: Edge Saw Manufacturing Co., Grand Rapids, Mich.

[21] Appl. No.: 839,323

[22] Filed: Oct. 4, 1977

[51] Int. Cl.² .................................................. B29D 27/04
[52] U.S. Cl. ............................ 425/89; 264/DIG. 84; 425/224; 424/329; 425/817 C
[58] Field of Search .................... 264/DIG. 84, 41; 425/89, 115, 224, 329, 4 C, 817 C, 375

[56] References Cited

U.S. PATENT DOCUMENTS

| | | | |
|---|---|---|---|
| 3,560,599 | 2/1971 | Ferstenberg | 425/4 C X |
| 3,672,348 | 6/1972 | Ferstenberg | 425/4 C |
| 3,833,695 | 9/1974 | Vidal | 425/4 C X |
| 3,837,771 | 9/1974 | Kolakowski et al. | 425/817 C X |
| 3,860,371 | 1/1975 | Willy | 425/817 C X |
| 3,887,670 | 6/1975 | Porter | 264/41 |
| 3,894,826 | 7/1975 | Kato | 425/224 |
| 3,984,195 | 10/1976 | DelCarpio | 425/817 C X |
| 4,032,275 | 6/1977 | Schwab et al. | 425/817 C X |
| 4,074,960 | 2/1978 | Dockray et al. | 425/817 C X |
| 4,093,109 | 6/1978 | Schrader | 425/817 C X |
| 4,102,621 | 7/1978 | Talbert | 425/817 C X |

FOREIGN PATENT DOCUMENTS 848040 11/1976 Belgium ............................ 425/817 C Primary Examiner—Mark Rosenbaum
Attorney, Agent, or Firm—John E. McGarry

[57] ABSTRACT

An apparatus for producing a foamed sheet of material has a mixing head mounted on a frame which is positioned on a track for longitudinal movement. The mounting head also engages a worm gear for vertical movement. Below the mixing head is a sloped portion of a conveyor. The sloped portion of the conveyor comprises a pair of stationary central panels and a right and left pair of panels. Each pair of panels is hinged together and slide toward and away from the longitudinal axis of the central panels. A paper sheet slides over the panels onto a level bottom conveyor. Vertical side fences are adjacent the side edges of the bottom conveyor panels. A paper sheet slides along the inside surface of each side fence at the same speed of the bottom sheet of paper. A worm gear adjusts the distance between the side fences. The sloped portion of the conveyor has a height adjustment mechanism at its upper and lower end and at the hinged portion of the panel. The central panels have air passages therethrough. A blower is operably connected to the air passages to blow air therethrough and under the paper sheet to glide the paper along the sloped conveyor.

13 Claims, 8 Drawing Figures

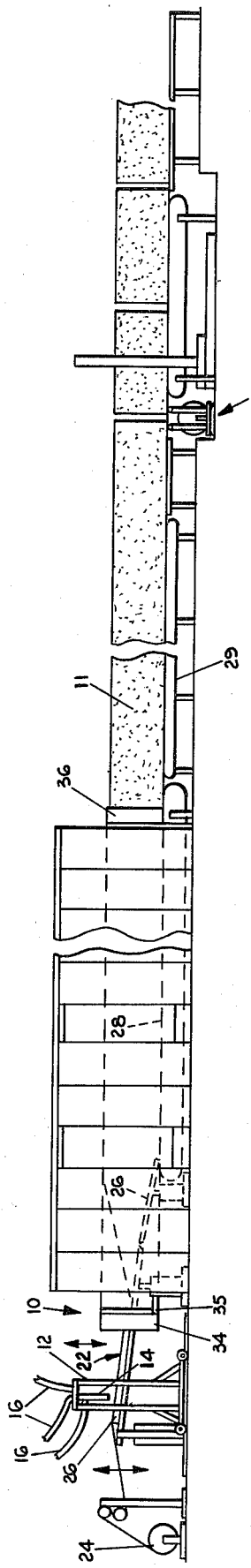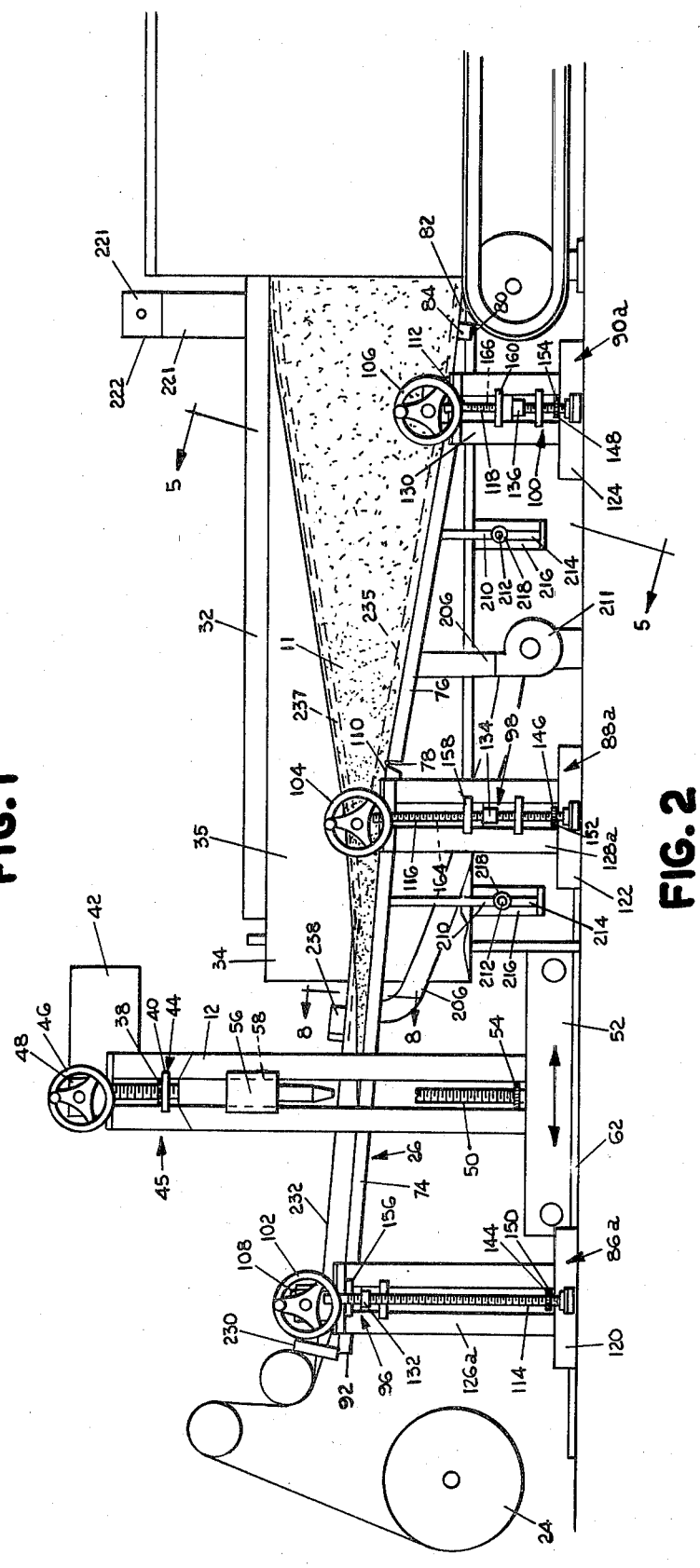

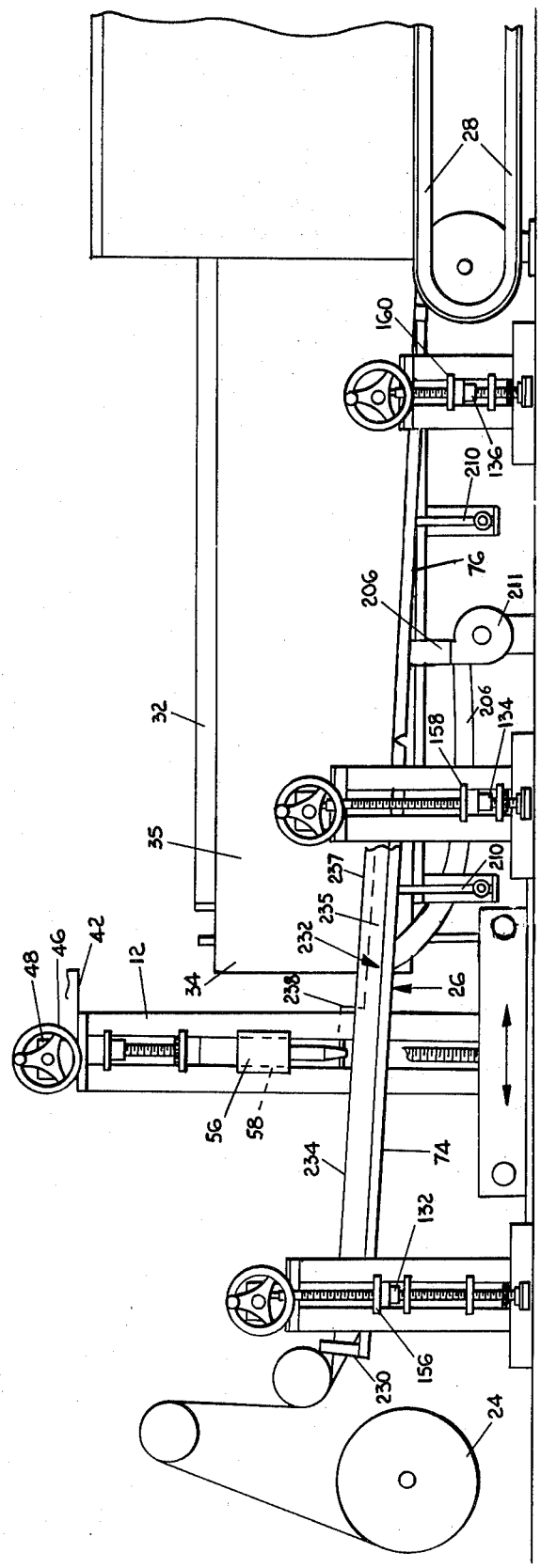
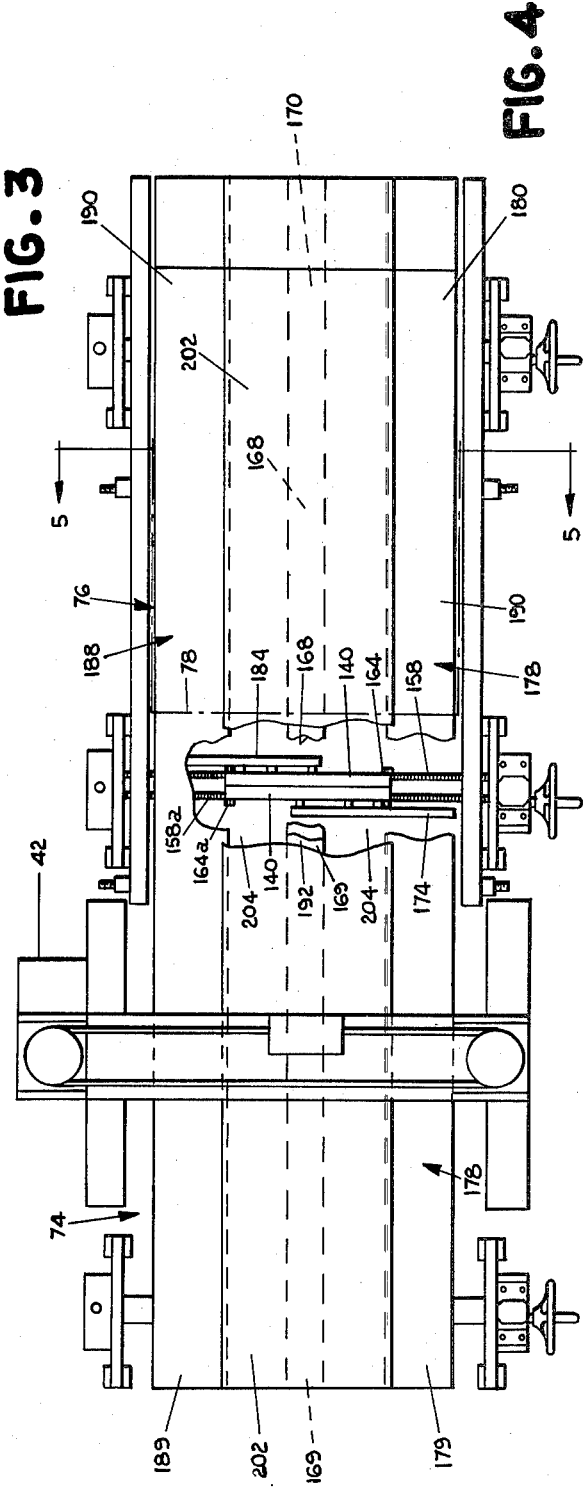

ADJUSTABLE APPARATUS FOR PRODUCING A FOAM MATERIAL

BACKGROUND OF THE INVENTION

1. Field of the Invention

The invention relates to continuous production of foam material and more particularly to an apparatus which produces substantially flat top foam materials of different widths.

2. Description of the Prior Art

Foam sheets have been made from a liquid polyurethane foaming material spread on a continuously moving channel-shaped conveyor. The problem encountered with this type of apparatus is that the side fences of the conveyor cause a downward drag on the rising foam, resulting in a convexly curved top on the sheet. For most uses of the foam, such as for furniture, the tops have to be flat to produce a desired seating surface. Most often the convexly shaped tops were cut to a flat top and the removed material was scraped.

Side fences have been developed which not only move with the bottom conveyor but also move upwardly with respect to the bottom conveyor where the foam rises to lessen or eliminate any downward drag caused by the side fence. Such side fence mechanisms are disclosed in U.S. Pat. No. 3,325,823 issued to Boone on June 13, 1967, and U.S. Pat. No. 3,091,811 issued to Hackert on June 4, 1963.

These devices are limited to a variety of foaming materials which can be used, since different foaming materials have different foaming rates. If the foaming rate is too fast, the drag is not eliminated and if the foaming rate is not fast enough, the side fences could cause upward drag, resulting in a concave top surface, a feature as undesirable as the convex top.

The sloped portion of the conveyor has to have its slope adjustable. U.S. Pat. No. 3,832,099 issued to Berg on Aug. 27, 1974 discloses a vertically adjustable section of the bottom conveyor.

The apparatus using a sloped bottom conveyor and upwardly inclined side conveyor adequately produce flat top foam blocks which can be cut to whatever desired length after the foaming is completed. However, if narrower foam blocks are desired, the foam blocks have to be sheared to form the narrower foam block. The cutting creates a waste of foam plus an extra process in making the final foam block.

SUMMARY OF THE INVENTION

According to the invention, an apparatus for continuously casting foam sheets has a bottom conveyor positioned below a means for supplying liquid foaming reagents thereto. Sidewalls are adjacent the conveyor to retain the foam as it rises on the conveyor. The side walls preferably have a surface moving in the direction of the foam and at the same relative speed. Preferably the surface is a paper sheet supported by a longitudinally stationary supportive wall. Means for controlling the upper contour of the rising foam are alongside of the side fences at a first position of the conveyor. Preferably a means for controlling the upper contour of the foam includes the first portion of the conveyor angled downwardly with respect to the sidewalls.

Means are connected to the side walls for adjustably moving the sidewalls for controlling the width of the space between the sidewalls such that the width of the foamable material on the conveyor is adjustable. Also means adjust the width of a portion of the conveying means. Preferably the adjusting means include the first portion of the conveyor longitudinally divided into at least two platforms with sliding means connected to each platform for sliding one longitudinal platform with respect to another in a horizontal direction transverse to the length of the conveyor. It is desirable that the side walls are adjacent the outer edges of the first portion of the conveyor. Means for covering the gaps between the platform is connected to at least one platform.

Further, according to the invention, the conveying surface of the conveyor is a flexible sheet which conveys the foaming material as the material is molded. Means for fitting the flexible sheet between the spaced side walls are attached to the conveyor upstream from the side walls such that the outer edges of the sheet are adjacent the side walls.

Desirably, the fitting means includes means for cutting any excess side portions from the sheet. In one embodiment, the fitting means includes a means for folding the outer edges of the sheet upward to form a retaining lip on the sheet. The cutting means cuts the excess height off the retaining lip to minimize drag between the lip and the rising foam. Preferably, the cutting means for each edge of the sheet has two parallel and opposing vertical plates connected to the frame and slightly spaced apart from each other for receiving the folded upward lip of the flexible sheet. Slots in both plates receive a cutting edge for cutting the excess height from the retaining lip as it passes through the space between the plates.

In one embodiment, the first portion of the conveyor supporting the flexible conveying surface has two side platforms mounted on a slidable track for horizontal movement transverse to the movement of the conveyor flexible sheet. A longitudinally stationary central platform is between the two side platforms. The covering means is a thin top sheet fixedly mounted to the central platform and extending outwardly beyond the side edge of the central platform and the inner side edge of each side platform to bridge the gap created by the sliding movement of the two side platforms.

Preferably, the two side platforms, the central platform and the top sheet are each divided into lower and upper plates. A hinge means connects the upper and lower sections together. Means for adjusting the downward inclination of the first portion of the conveyor are attached thereto. Preferably the adjusting means are connected to the upper and lower sections of the platform for controlling the relative height and inclinations thereof.

In one embodiment, means for creating a pressurized air flow has a passage means with an outlet under the flexible sheet to create an air cushion between the flexible sheet and platforms in the first portion of the conveyor. Desirably, the central platforms have a plurality of passageways therethrough aligned with the plurality of passageways through the thin top sheet which are in communication with the pressurized air flow.

In one embodiment, means are connected to the supply means for adjusting the height and longitudinal positions of the supply means over the first portions of the conveyor.

BRIEF DESCRIPTION OF THE DRAWINGS

The invention will now be described with reference to the accompanying drawings in which:

FIG. 1 is a side elevational view of a conveyor system illustrating a preferred embodiment of the invention.

FIG. 2 is a partially segmented enlarged side elevational view of the embodiment illustrated in FIG. 1.

FIG. 3 is a partially segmented enlarged side view of the embodiment shown in FIG. 2 in a second position of the conveyor.

FIG. 4 is an enlarged fragmentary and partially broken plan view of the embodiment shown in FIG. 1.

DETAILED DESCRIPTION OF THE PREFERRED EMBODIMENT

Figure 5:
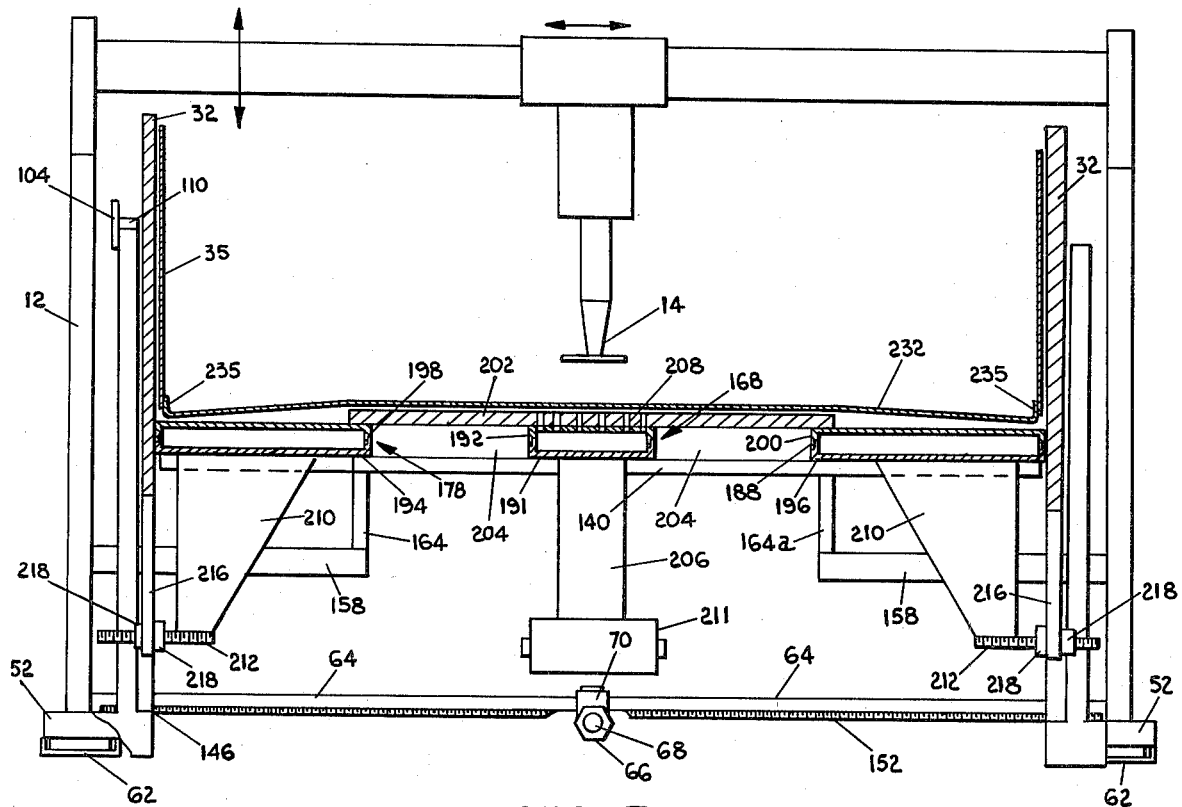
FIG. 5 is a side cross-sectional view taken along lines 5—5 in FIG. 4.

Referring particularly in FIG. 1, an apparatus generally indicated as 10 has a frame 12 supporting a mixing head 14. Various hoses 16, tanks, and pumps are connected to the mixing head in a conventional fashion for supply of foamable liquid. A conveyor 22, originating from a paper roll 24 passes over and is supported by a first portion 26 called a pour plate, passing under mixing head 14, and passes over and is supported by a second portion 28 and third portion 29 extending from the pour plate 26 to a foam saw apparatus 30. The pour plate 26 is disposed at an acute angle to the horizontal. At the sides of the conveyor 22 are side fences 32. A paper roll 34 which has its paper 35 unwind and abut the inner surface of the side fences 32 to a take up roll 36.

Figure 7:
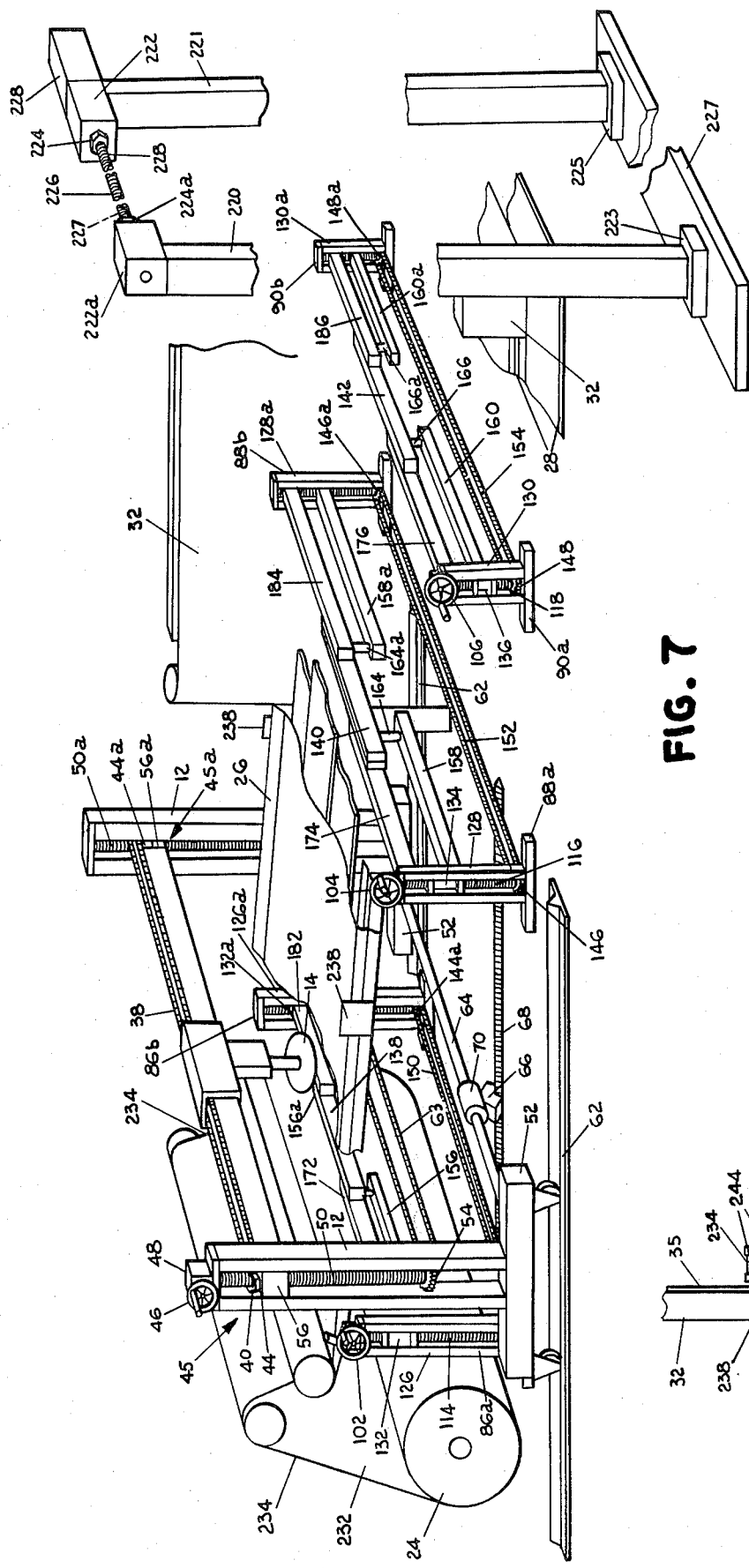
FIG. 7 is a skeletal perspective view of the adjustable stands of the preferred embodiment of the invention.

As more clearly shown in FIGS. 2 and 7, the mixing head 14 is attached to chain 38 which is trained around sprockets 40 and driven by motor 42. The mixing head 14 is driven back and forth, traversing the width of the conveyor. The sprockets 40 are contained in a sprocket housing 44.

A worm gear 45 is operably mounted within the frame 12. The worm gear 45 is operated by handle 46 through gear reducer 48. The reducer 48 turns the worm gear shaft 50. The gear reducer is mounted on frame 12. The bottom of the worm gear shaft 50 is also rotatably mounted on the frame 12. A brass block 56 has stabilizer lugs 58 which engage the frame 12. The threaded block 56 also engages the gear shaft 50 so when the shaft rotates, the threaded brass block is raised or lowered. The sprocked housing 44 is also connected to the brass block 56 and is correspondingly raised or lowered. At the bottom of the gear shaft 50 is a sprocket 54. A chain 63 is trained around the sprocket 54 and engages a sprocket 54a as seen in FIG. 7 at the other side of the conveyor which also is attached to a worm gear shaft 50a of a worm gear 45a similar to the one described but lacking the gear reducer and handle. The sprocket housing 44a at the other side of the conveyor is similarly connected to a brass block 56a which is similarly raised or lowered by the rotation of handle 46. Handle 46 can be also replaced by a motor which drives the gear reducer 48.

The mixing head frame 12 is mounted on bases 52 which slidably ride on tracks 62. Each base 52, as shown in FIGS. 5 and 7, is connected by a transverse bar 64 which, in turn, is connected to a motor housing 70. The motor housing 70 is mounted on a stationary worm gear shaft 68. The motor rotates a threaded brass block 66 which engages the worm gear shaft 68. As the brass block threads up and down the shaft 68, the bases 52 slides within their tracks 62.

Referring back to FIG. 2, the pour plate 26 is positioned below the mixing head 14. The pour plate 26 is divided into an upper section 74 and lower section 76, hinged together by hinge 78. At the lower edge 80 of the lower section 76, a transition plate 82 is connected to the lower section 76 by hinge 84.

Referring now to FIGS. 2 and 7, the pour plate 26 is supported by three pairs of stands: 86a and 86b, 90a and 90b, and 88a and 88b. One stand 86a, 88a and 90a of each pair is positioned at the near edge of conveyor. The other stand 86b, 88b and 90b of each pair is positioned at the far edge of the conveyor. Stands 86a and 86b support the upper edge 92 of the upper section 74. The pair of stands 88a and 88b support the lower edge of the upper section 74 near hinge 78. The third pair of stands 90a and 90b supports the lower edge 80 of the lower section 76 near hinge 84.

Each of the stands 90a, 92a and 94a contain worm gears 96a, 98a, and 100a, respectively. The worm gears are the same general type as worm gear 45 connected to mixing head 14. The worm gears 96a, 98a and 100a each have a rotatable handle 102a, 104a and 106a, respectively. Each handle is respectively connected to gear reducer 108, 110 and 112 which are connected to a top end of worm gear shaft 114, 116 and 118, respectively. Each gear shaft is rotatably mounted onto a vertical gear housing 126, 128 and 130, respectively. Brass blocks 132, 134 and 136 having threaded holes threadably engage the worm gear shaft 114, 116 and 118, respectively. Brass block 132 is rigidly connected to bracket 156 which is connected to central track 138.

As shown in FIG. 7, rotatably mounted to the brass blocks 134 and 136 are brackets 158 and 160 extending toward the central portion of the conveyor 22. The brackets 158 and 160 have vertical extensions 164 and 166 respectively mounted to slide tracks 140 and 142. FIG. 5 shows another view of the bracket 158 and vertical extension 164.

At the bottom of worm gear shafts 114, 116 and 118 are sprockets 144, 146, and 148, respectively. Chain 150 is trained around sprockets 144 and 144a; chain 152 is trained around sprockets 146 and 146a; and chain 154 is trained around sprockets 148 and 148a. Each sprocket is connected to a like worm gear shaft 114a, 116a and 118, respectively. Each worm gear shaft is rotatably mounted in housing 126a, 128a and 130a, respectively.

Brass blocks 132a, 134a and 136a are threaded onto the respective shafts 114a, 116a and 118a. Brass blocks 134a and 136a are rigidly connected to brackets 158a and 160a. Vertical extensions 164a and 166a connect the respective brackets onto the slide tracks 140 and 142. Brass block 132a is connected to track 138.

The rotation of the handles 102, 104 and 106 respectively rotate the worm gear shafts 114, 116, and 118, and the sprockets 144, 146 and 148. The chains 150, 152 and 154 move to correspondingly rotate the shafts.

As the worm gears are rotated, the threaded brass blocks 132, 132a, 134, 134a, 136 and 136a are raised and lowered on the shafts 114, 114a, 116, 116a, 118 and 118a. The brackets 156, 158 and 160 and 156a, 158a and 160a also are correspondingly raised and lowered which, in turn, raise or lower pour plate 72.

As shown in FIG. 3, compared to FIG. 2, the upper and lower sections 74 and 76 of the pour plate 26 can be adjusted to different heights and different inclinations.

Referring now to FIGS. 4, 5 and 7, the pour plate 26 is longitudinally divided into three platforms or panels 168, 178 and 188. The vertical extensions 164, 164a, 166 and 166a are attached to center tracks 140 and 142, respectively. Brackets 156 and 156a are directly attached to center track 138. Each center track 138, 140 and 142 is mounted transversely to the length of the conveyor to a bottom surface of a central panel 168 of the pour plate 72. The central panel 168 has an upper section 169 and lower section 170 corresponding to the upper and lower sections of the pour plate 74 and 76.

Slidably mounted to the central tracks 138, 140 and 142 respectively are left tracks 172, 174 and 176. Left tracks 172 and 174 are mounted to a bottom surface of a left panel 178 of the conveyor pour plate. Again, the left panel 178 has an upper section 179 and a lower section 180 corresponding to the upper section 74 and lower section 76 of pour plate 26.

Likewise, right tracks 182, 184, and 186 are attached to the right panel 188 of the pour plate 72. Again, the right panel is also hinged between an upper section 189 and a lower section 190 thereof.

Particularly referring to FIGS. 4 and 5, the central panel 168 is a hollow elongated channel with a bottom strip metal interfitted on a top strip 192.

Likewise, the left and right portions 178 and 188 respectively have a bottom strip 194 and 196 interfitted with a top strip 198 and 200.

The left and right panels 178 and 188 are slidable toward and away from the central axis of a central panel 168. Attached to the top strip 192 is a cover piece 202 which extends outwardly from the outer edges of the top strip 192 and bridges the gaps 204 between the central panel 168 and left and right panels 178 and 188, respectively.

Figure 6:
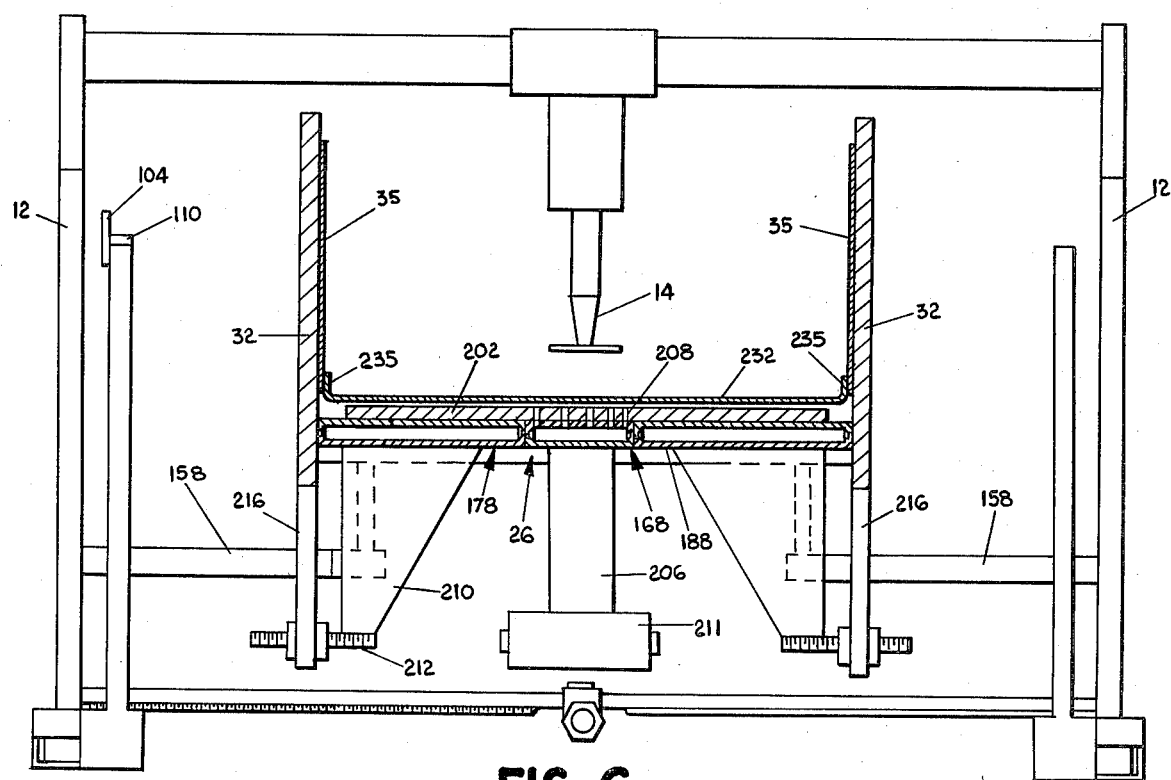
FIG. 6 is a side cross-sectional view as shown in FIG. 5, showing a second position of the side walls.

As shown in FIGS. 4, 5, and 6 an air hose 206 is connected to the bottom strip 191 of the central panel 168. A plurality of apertures 208 extend through the top strip 192 of panel 168 and also through the cover piece 202 to be in fluid communication with the air hose 206. A blower 211 is operably connected to the air hose 206 to blow air through the air hose through the upper and lower section 169 and 170 central panel 168.

Attached to the bottom of the side panels 178 and 188 are flanges 210. The bottom edge of each flange is welded to a threaded shaft 212. The threaded shaft extends through a slot 214 within brackets 216. Nuts 217 threadably engage the shaft 212 at both sides of brackets 216. The brackets 216 extend upwardly and are affixed to the side fence 32.

Referring to FIGS. 2 and 7, vertical supports 220 and 221 extend upwardly from each side fence 32. The vertical supports are attached to the side fence 32. The base 223 and 225 of the vertical supports are slidably mounted on track 227. At the top of the vertical supports 220 and 221 are housings 222 and 229, each of which rigidly secures brass nuts 224 and 224a, respectively. The brass nuts 224 and 224a engage a threaded shaft 226 with the left side 227 thereof threaded in one direction and the right side threaded in the opposite direction. The shaft 226 is operably connected to a motor 228 such that when the shaft 226 rotates, the left brass nut 224a and right brass nut 224 will be simultaneously moved axially along the shaft to slide the supports along stationary track 227 and move the side fences 32 toward the central longitudinal axis of the conveyor, or away from the said axis. As the side fences 32 move to and from the central axis, the left and right panels 178 and 188 correspondingly move under the cover piece 202, either toward or away from the central longitudinal axis of the conveyor.

Referring particularly to FIGS. 5 and 6, the conveyor is shown in two distinct positions with the side fences 32 and side panels 178 and 188 located toward the central axis of the conveyor 22 in FIG. 6.

As shown in FIGS. 1 and 2, a paper roll 24 unwinds paper 232 to cover the panels 168, 178 and 188 and continues through the second portion 29 of the conveyor 22. The paper 232 has a width adapted to fit the conveyor at the widest position as shown in FIG. 5.

Mounted in proximity of the top edge of the first portion 26 of the conveyor are paper rollers 230 to fold the outer edges 234 of the paper sheet 232 from the paper roll 24. The outer edges 234 are folded vertically by rollers 230.

Figure 8:
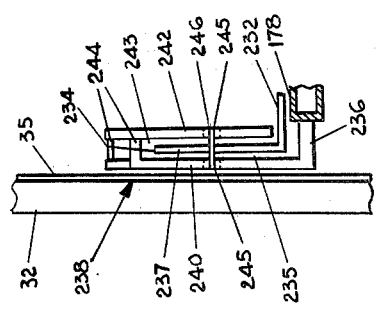
FIG. 8 is an enlarged elevational view of a paper cutter as shown in FIG. 2 taken along lines 8—8 in FIG. 2.

Downstream from the paper rollers 230 and fixedly connected to the side fences by supports 236 is a paper cutter 238. The paper cutter is located above each outer edge of the side panels 178 and 188 as shown more clearly in FIG. 8. The paper cutter has two vertical plates 240 and 242 placed parallel and slightly to the inside of the side fences 32. A relatively thin space 243 lies between the two opposing plates 240 and 242. The opposing plates have at their top portions supports 244 which extend through the side panels and are fixedly connected thereto. A horizontal slot 245 extends through both plates 240 and 242. A knife blade 246 with its plane parallel to the plate of the upper section 74 of the pour plate 72 has a cutting edge toward the paper roll 24. The knife blade 246 cuts excess height from the vertical outer edges 234 of the paper 232 as the paper 232 travels along the conveyor 22 and retains a vertical lip 235.

In operation, a liquid foamable material 11, such as polyurethane, passes out of the mixing head 14 onto the moving paper 232. The moving paper has its outer edges vertically folded by the paper rollers 230. Before the foam 11 rises any significant amount, the vertical edges of paper 232 are cut by the paper cutter 238. The paper and foamable material move downstream to where the side paper rolls 34 unwind paper 35 to the inner surface of the side fences 32. Both of the side fence papers 35 move at the same speed as the paper 234. As the paper 234 moves downwardly down the sloped pour plate 26, the foam 11 rises above the lip 235 and abuts the side fence paper 35. The foam rises at approximately the same rate as the paper 234 declines down the lower section 76 of the inclined pour plate 26. It should be apparent from the foregoing that most of the foaming takes place on the lower section 76 of the pour plate 26 although a small amount of foaming takes place at the upper section 74 thereof as illustrated in FIG. 2. The upper section 74 is positioned at a slight angle or declination to the horizontal to permit the foaming material, while it is relatively fluid, to reach the point at which substantial foaming begins and it becomes viscous enough to accommodate the steeper declination angle of the lower section 76 without significant flowing down the pour plate. The point at which the foaming material becomes viscous enough to accommodate the steeper declination angle of the lower section 76 without significant flowing down the pour plate is called the cream point or "creaming of the foam." When the foam has substantially reached its final height, the paper 234 passes over the transition plate 82 onto the horizontal second portion 28 of the conveyor 22. The foam is still retained by the side fences until it reaches the end of the second portion 28. The foam is then set to freestanding form as it moves down to the third portion 29 of the conveyor 22 and then to the saw 30 where the foam is cut into blocks of predetermined lengths.

As shown in FIG. 5, when a narrower foam block is desired, the motor 228 rotates the worm gear shaft 226 mounted above the side fences 32 and the brass nuts 224 and 224a are moved inwardly toward the center of the shaft. The side fences are then moved closer together and simultaneously the side panels 178 and 188 slide inwardly on the tracks 172, 174, and 176 and 182, 184, and 186 along the center tracks 138, 140, and 142. The mixing head pours liquid foamable material onto the paper 232 as the paper 232 moves downstream along the conveyor 22. The outer edges 234 of the paper 232 is folded upwardly and the cutter 238 cuts the excess height off the outer edges to retain a lip 235 of approximately one inch. The foam 11 foams in the same manner as previously discussed and is retained by the now closer side fences 32. The excess paper 237 cut by the paper cutter 238 is moved upwardly along paper 35 as the foam rises therealong.

Different foams, having different foaming rates, must be accomodated to achieve the flat top which is desired in foam blocks. Adjustments can be made to the foaming head by moving it longitudinally with respect to the conveyor by operation of motor 70 which moves the mixing head frame 12. The height of the mixing head can also be adjusted by the operation of the handle 46 connected to worm gear 45.

In addition, the inclination of the upper section 74 and lower section 76 of the pour plate 72 can be adjusted so that the relative rise of the side paper 35 can be increased or decreased as shown in FIGS. 2 and 3. The operation of worm gears 96, 98, and 100 adjust the height and inclination of the upper section 74 and lower section 76 of the pour plates 72 with respect to the side fence 32. Adjustments to the inclination of the upper section 74 and lower section 76 of the pour plate 72 may be desired even when the same foam is used if the side fences 32 are differently spaced apart.

The vertical lip 235 of the paper 232 is slightly spaced from the side fences so that friction between the two papers 35 and 234 is minimized. The side fences 32 can be adjustably spaced from the side panels and vertical lip 235. As shown in FIGS. 5 and 6, the nuts 218 can be threaded along the shaft 212 to horizontally move the brackets 216 and consequently the side fences 32 relative to the side panels 78 and 88 to bring the side fence closer to the vertical lip 235 or slightly farther away from the vertical lip 235.

As the paper 235 moves downstream, it floats on a thin film of gas supplied through the plurality of apertures 208 through the cover plate and central panel. The thin film reduces drag on the conveyor until the paper 235 flows into the second portion 28 of the conveyor.

In this fashion, a continuous foam molding apparatus can be adjustable to make flat foam blocks of different widths and heights. The side fences are free to move in and out without interference from the sloped pour plate therebetween. The sloped pour plate is correspondingly adjustable to retain its outer edges adjacent the side fences in a plurality of positions while retaining a substantially flat surface widthwise suitable for receiving foaming reagents thereon.

Reasonable variation and modification are possible within the scope of the foregoing disclosure, drawings, and the appended claims without departing from the spirit of the invention.

The embodiments of the invention in which an exclusive property or privilege is claimed are define as follows:

1. An apparatus for continuously molding a foamable material comprising:

a conveyor support having a flat upper plate at a declination to the horizontal slight enough to substantially preclude liquid foamable reactants from flowing therealong, a flat lower support member in abutting relationship to the upper plate and at a declination to the horizontal greater than that of the upper plate; and a longer horizontal curing portion joined to the lower support member;

means operatively associated with said conveyor support for conveying the foamable material over the conveyor support from the upper plate to the horizontal curing portion thereof;

means mounted above the conveyor support upper plate or supplying unfoamed liquid foam reactants to the conveying means at the upper plate of the conveyor support;

the length of the upper plate being sufficient to permit creaming thereon of the unfoamed liquid reactants which are supplied thereto by said liquid foam reactants supply means;

the length of the lower support member being sufficient to permit substantially complete foaming of the creamed foamable reactants thereon;

means for controlling the upper contour of the molded foam including side wall surfaces moving along adjacent the conveying means and at an inclined angle with respect to the lower support member of the conveying means;

means connected to the supplying means for adjusting the longitudinal position of the supplying means to adjust the lay-down point of the foamable materials on the conveyor with respect to the upper plate of the conveyor support;

means for adjustably moving at least one side wall surface in a direction transverse to the plane of the side wall surfaces to control the width of the space between the side wall surfaces;

means for adjusting the width of the upper plate and lower support member of the conveyor support to correspond to adjustments to the side wall position; and means for adjusting the relative angle of the upper plate and lower support member of the conveyor support to control the angles thereof with respect to the horizontal.

2. An apparatus as defined in claim 1 wherein:

at least one of the upper plate and the lower support member of the conveyor support is longitudinally divided into at least two spaced platforms;

means are attached to each platform for sliding the platforms with respect to each other in a horizontal direction transverse to the length of the conveyor whereby gaps are formed therebetween;

means for maintaining the outer edges of the platforms adjacent the side walls as the platforms slide with respect to each other; and means positioned between the platforms for covering the gaps between the platforms such that the covering means and platforms form a substantially flat surface in the direction transverse to the length of the conveyor.

3. An apparatus as defined in claim 2 wherein:
the conveying means includes a flexible conveying surface supported by the platforms and covering means; and
means connected to the upper plate of the conveyor support upstream from the side walls for fitting the flexible conveying surface between the side walls.

4. An apparatus as defined by claim 3 wherein the fitting means includes a cutting means for cutting excess width from the flexible conveying surface.

5. An apparatus as defined in claim 4 and further comprising:
means connected to the upper plate of the conveyor support for folding the outer edges of the flexible conveying surface upwardly to form a retaining lip; and
the cutting means is positioned to cut excess height from the retaining lip to minimize drag between the lip and foamable material.

6. An apparatus as defined in claim 3 and further comprising:
means extending through at least one of the platforms and cover means for passing a gaseous stream under the flexible conveying surface to form a gaseous cushion between the platforms and cover means, and conveying surface.

7. An apparatus as defined in claim 6 wherein the passing means includes an inlet passage in the bottom surface of one platform and a plurality of small apertures in the top surface of the platform in fluid communication with the inlet;
a plurality of apertures extending through the cover means in fluid communication with the apertures in the platforms;
a blower means is operably connected to the inlet for flowing air through the inlet and apertures to form an air cushion under the flexible conveying surface.

8. An apparatus as defined in claim 2 wherein:
a left platform and right platform are each slidably connected by the sliding means to a central platform;
the cover means is a thin top sheet attached to the central platform, extending over the side edges of the central platform, overlapping the inner side edges of the left and right platforms to cover the gaps between the edges of the central and left and right panels.

9. An apparatus as defined in claim 1 and further comprising:
means for hinging the upper plate to the lower support member of the conveyor support.

10. An apparatus according to claim 1 and further comprising means to adjust the vertical position of the liquid supply means with respect to the upper plate of the conveyor support to maintain constant the spacing of the liquid supply means with respect to the upper plate of the conveyor support at different longitudinal adjusted positions of the liquid supply means with respect to the conveyor support upper plate.

11. An apparatus as defined in claim 1 wherein:
the supplying means includes a mixing head mounted above the conveying means; and means for traversing the upper portion of the conveyor with the mixing head.

12. An apparatus as defined in claim 1 wherein the longitudinal position adjusting means for the liquid supply means includes a frame mounting the supplying means, the frame movably mounted on a track means which is adjacent and parallel to the conveying means such that the frame is movable in the direction of the conveying means.

13. An apparatus as defined in claim 12 and further comprising motor means operably connected to the frame for moving the frame in the longitudinal direction of the conveying means.

* * * * *